A. DONDEY & J. C. TESTRO.
HIGH PRESSURE FILTER.
APPLICATION FILED FEB. 17, 1910.

999,759.

Patented Aug. 8, 1911.
2 SHEETS—SHEET 2.

WITNESSES
W. P. Burke
John A. Percival

INVENTORS
Albert Dondey
James Charles Testro
BY
Wm. McMillan Klein
ATT'Y.

UNITED STATES PATENT OFFICE.

ALBERT DONDEY AND JAMES CHARLES TESTRO, OF SOUTH MELBOURNE, VICTORIA, AUSTRALIA.

HIGH-PRESSURE FILTER.

999,759.  Specification of Letters Patent.  Patented Aug. 8, 1911.

Application filed February 17, 1910.  Serial No. 544,384.

*To all whom it may concern:*

Be it known that we, ALBERT DONDEY and JAMES CHARLES TESTRO, subjects of the King of Great Britain and Ireland, both residing at 274 City road, South Melbourne, in the State of Victoria, Commonwealth of Australia, have invented new and useful Improvements in High-Pressure Filters, of which the following is a specification.

Our invention relates to high pressure filters in which paper pulp is used as a filtering medium.

The invention has for its object to provide, first: a simple, durable, and efficient filter for rapidly filtering water and other fluids, such as wine, cider, and the like, to such an extent that the fluorescent property present in some transparent liquids, generally at their surface, which is due to inefficient filtration, will be entirely eliminated. Second, to provide a filter in which the filtering medium can be easily renewed or cleaned, or sterilized without removal.

The following is a specification which is to be read with the accompanying sheets of drawings, in order that our invention may be fully understood.

Figure 1:
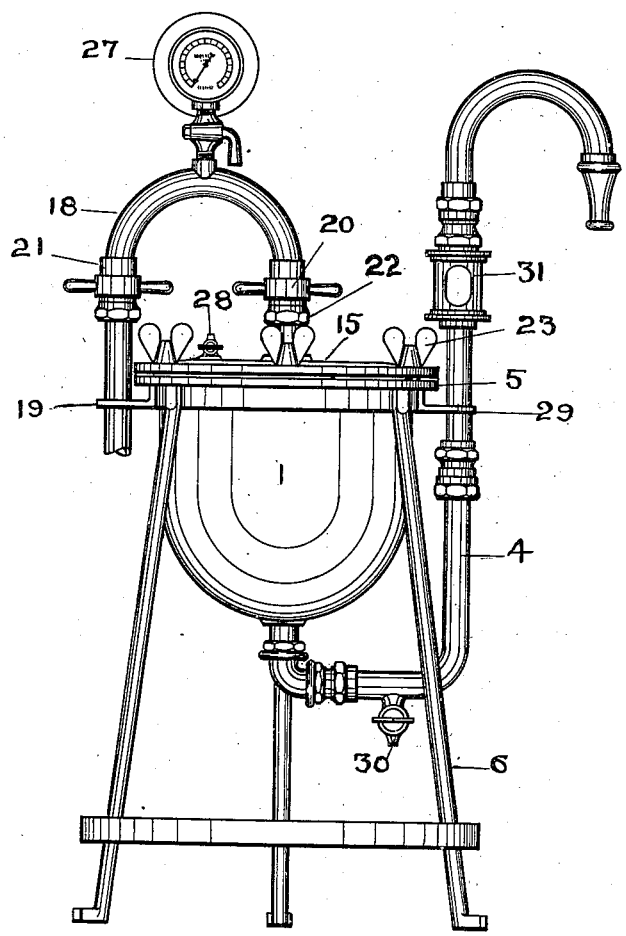
Figure 2:
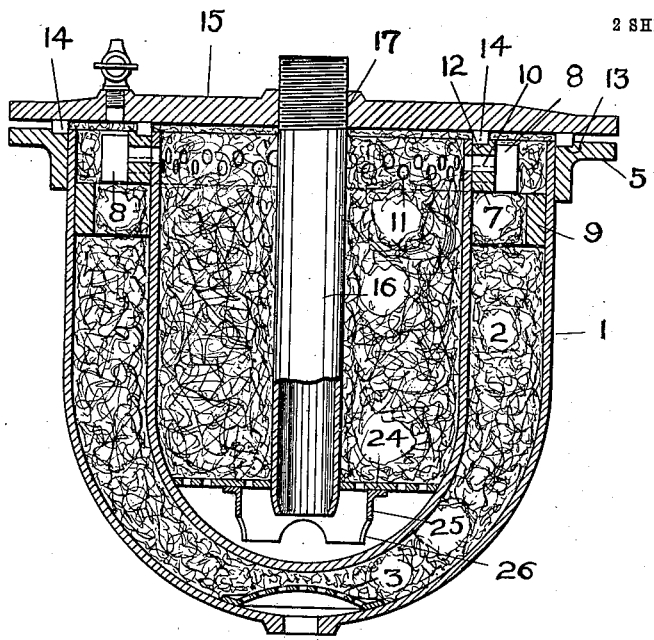
Figure 3:
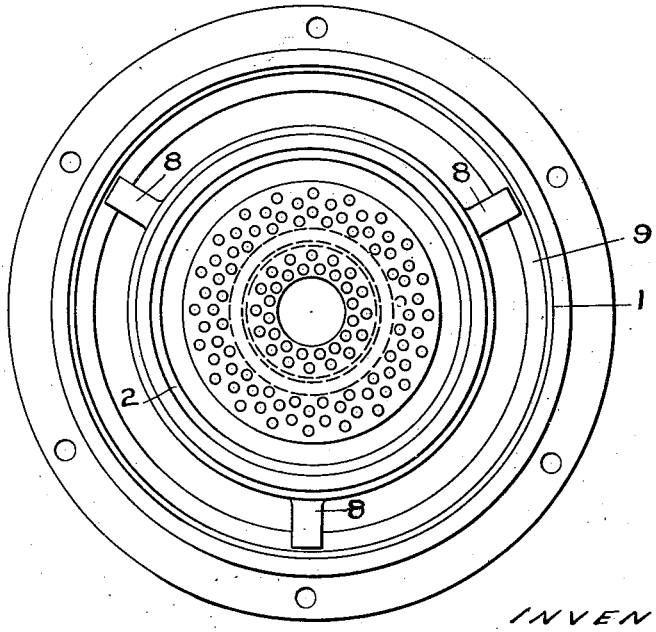

Referring to the drawings; Figure 1 represents a general view of our filter shown supported by means of a frame or stand. Fig. 2 is a central sectional elevation of our filter, without its stand. Fig. 3 is a plan of the filter without its cover.

Our filter consists essentially of two dished metal cisterns (1) and (2) of different diameters, arranged vertically one within the other. The inner cistern is removable, and is smaller, and also shorter than the outer one. By such an arrangement of cisterns we provide two compartments which are filled with paper pulp through which the fluid to be filtered is passed.

Within the outer cistern, and upon its bottom portion, is fixed a strainer (3) which covers the inner opening of the filtered fluid outlet pipe (4). The top ends of the cisterns are open, while the bottom portions are dished or semi-spherically shaped. The open ends lie flush with each other, and the upper end of the cistern (1) is provided with an L shaped flange (5), which is carried by the frame or stand (6) as shown at Fig. 1. This flange (5) also serves as one seat for the removable cover hereinafter described, while the collar (7) is suitably secured to the inner cistern (2) and acts as another seat. From said collar are projected the three equidistant radial arms (8), the outer ends of which rest upon the supporting ring (9) suitably fixed adjacent to the upper end of said outer cistern (1) so as to support within the latter the inner cistern (2) in its central position, and at the same time allow of its easy removal. The collar (7) has perforations (10) drilled therethrough in staggered relation around its circumference to communicate with two or more rows of perforations (11) provided in the upper end of said inner cistern (2) so that the filtering fluid may pass from the latter to the outer cistern in a lateral direction. Adjacent to the inner circumference of flange (5) and collar (7) we provide recesses (12) and (13) to receive the two gasket rings (14) upon which the aforesaid removable cover (15) is seated. This cover is provided with the fluid inlet nozzle (16) which is externally threaded at its upper end to fit into the threaded central hole (17) of said cover. (18) is the fluid inlet pipe which is supported by the bracket (19) and provided with two ordinary steam couplings (20) and (21). For holding down the cover (15) upon the gasket rings (14) we provide several threaded vertical studs disposed equidistant around and projected from said flange (5) to pass through holes which occupy corresponding positions in said cover (15). By the employment of winged nuts (23) upon said studs, the cover may be easily removed or replaced as desired. The before-mentioned fluid inlet nozzle (16) is projected downward from the removable cover (15) into the inner cistern, and its lower end portion is left open, and is situated beneath the floor of the strainer (24) which is seated upon the dished bottom of said inner cistern (2). A tubular seat (25) is projected from the underside of said strainer and is scalloped as at (26) around its lower edge, so that the inlet fluid will have free ingress to the inner cistern (2).

We wish it to be here understood that the strainers (3) and (24) and perforations (10) and (11) respectively are intended as passage-ways for the fluid, and also for preventing any escape of the paper pulp, as this is employed in the shredded state.

The cisterns are made preferably of copper, and the other parts of any suitable metal, and all are heavily tinned in order to render them proof against oxidation.

For the purpose of ascertaining the pressure of the fluid after its admission to the filter, we provide the fluid inlet pipe (18) with the pressure gage (27), while for allowing of the escape of any air contained in the outer filtering compartment, we arrange the air-cock (28) in the cover (15). Extended from the frame (6) is a bracket (29) for supporting the outlet pipe (4) in the lower portion of which is fixed the cock (30), fluid may be drawn off after any cleaning or sterilizing whereby any sedimentary operation has been effected; and by means of the glass sight indicator (31) the condition of the filtered fluid can be inspected.

For the efficient filtration of the fluid, we first tease the paper pulp into shreds resembling wool, then it is soaked in boiling water for sufficient time to allow its becoming a loose pulp, and finally, when so prepared, is tightly pressed into the two compartments of the filter. This pulp is of a fibrous nature, and when the fluid pressure is put on, it is compressed into a compact body.

The working of our invention is as follows:—In our filter the unfiltered fluid is pumped or admitted under pressure by means of the inlet pipe (18) and nozzle (16) to the lowest part of the inner cistern, and ascends through the strainer (24) and the filtering medium to its upper portion, thence through the perforations (11) of said cistern (2) and collar (7), and finally passes down through the outer cistern (1) and strainer (3) to the outlet pipe (4). Most of the gross filtration, especially of solid matter, takes place in the inner compartment, and it is most important that the paper pulp should be tightly compressed when charging the filter, in order to insure the maximum of efficiency. As the filter is fitted with steam couplings as at (20) and (21), at the water inlet, a flexible steam hose may be attached, so that steam may be introduced to play on the pulp, in order to render the latter so porous that the sediment or dirt will be separated and forced out through the outlet pipe (4) of filter, after which it is again ready for use.

We claim:—

1. In a filter of the kind described, in combination, an outer cistern, a supporting ring secured to the inner wall thereof adjacent its upper end, an inner cistern provided with a collar having radial arms projecting therefrom and adapted to rest upon said supporting ring, said collar and the wall of said inner cistern to which it is secured being provided with perforations whereby the fluid may pass from the inner cistern to the space between the inner and outer cisterns, a fluid inlet associated with one of said cisterns, a fluid outlet associated with the other of said cisterns, and a filtering medium within said inner cistern and between said inner and said outer cisterns.

2. In a filter of the kind described, in combination, an outer cistern and an inner cistern forming two compartments, said inner cistern being provided with perforations in its wall whereby fluid may pass from one compartment to the other, a filtering medium within said compartments, a fluid outlet associated with one of said compartments, a fluid inlet associated with the other of said compartments, a flange adjacent the upper end of the said outer cistern, a collar adjacent the upper end of said inner cistern, said flange and said collar being provided with recesses and a removable cover for said cisterns and provided with gaskets adapted to engage said recesses.

3. In a filter of the kind described, in combination, an outer cistern and an inner cistern forming two compartments, said inner cistern being provided with perforations in its wall whereby fluid may pass from one compartment to the other, a filtering medium within said compartments, a removable cover having a fluid inlet nozzle secured thereto, a strainer positioned adjacent the bottom of said inner cistern, said inlet nozzle extending to a point below the strainer, and a fluid outlet associated with said outer cistern.

ALBERT DONDEY.
JAMES CHARLES TESTRO.

Witnesses:
ALBERT E. S. SWANSON,
FLORENCE E. SWANSON.